US011679703B2

(12) United States Patent
Mathew et al.

(10) Patent No.: US 11,679,703 B2
(45) Date of Patent: Jun. 20, 2023

(54) VEHICLE SEAT ASSEMBLY HAVING A SURFACE TEXTURING INTRUSIONS

(71) Applicant: LEAR CORPORATION, Southfield, MI (US)

(72) Inventors: Vineetha Mathew, Lake Orion, MI (US); Asad S. Ali, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 63 days.

(21) Appl. No.: 17/362,576

(22) Filed: Jun. 29, 2021

(65) Prior Publication Data
US 2022/0001780 A1    Jan. 6, 2022

Related U.S. Application Data

(60) Provisional application No. 62/705,542, filed on Jul. 2, 2020.

(51) Int. Cl.
*B60N 2/70* (2006.01)
*B29C 44/34* (2006.01)
*B29L 31/00* (2006.01)
*B29K 105/04* (2006.01)
*B29L 31/30* (2006.01)

(52) U.S. Cl.
CPC .......... *B60N 2/7017* (2013.01); *B29C 44/355* (2013.01); *B29K 2105/04* (2013.01); *B29K 2995/007* (2013.01); *B29L 2031/3005* (2013.01); *B29L 2031/771* (2013.01)

(58) Field of Classification Search
CPC .......... B60N 2/7017; B29C 44/355; B29K 2105/04; B29K 2995/007; B29L 2031/3005; B29L 2031/771

USPC .................................................. 297/452.21
See application file for complete search history.

(56) References Cited

U.S. PATENT DOCUMENTS

| | | | |
|---|---|---|---|
| 5,226,188 A | * | 7/1993 | Liou ................ A47C 7/742 5/653 |
| 5,248,185 A | | 9/1993 | Weingartner et al. |
| 5,816,661 A | | 10/1998 | Sakurai et al. |
| 7,661,764 B2 | | 2/2010 | Ali et al. |

(Continued)

FOREIGN PATENT DOCUMENTS

| | | |
|---|---|---|
| EP | 2 444 281 B1 | 7/2016 |
| FR | 3 088 051 B1 | 5/2021 |

(Continued)

OTHER PUBLICATIONS

Indian First Examination Report dated Feb. 28, 2022, Application No. 202144029588, 5 Pages.

*Primary Examiner* — Mark R Wendell
(74) *Attorney, Agent, or Firm* — Brooks Kushman P.C.

(57) ABSTRACT

In at least one embodiment, the present disclosure provides a vehicle seat assembly comprising a cushion having an "A" surface and a "B" surface, a central portion, and two bolster areas, with each bolster area being adjacent the central portion, with the cushion having a plurality of intrusions extending from the "A" surface towards the "B" surface to form a hardness gradient between at least one of the bolster areas and the central portion of between 5% to 25%, the plurality of intrusions comprising a plurality of pairs of patterns, each pair of patterns comprising a first pattern spaced apart and opposingly and inversely facing a second pattern.

20 Claims, 2 Drawing Sheets

(56) References Cited

U.S. PATENT DOCUMENTS

| | | | |
|---|---|---|---|
| 7,934,774 B2 | 5/2011 | Galbreath et al. | |
| 8,215,714 B2 | 7/2012 | Galbreath et al. | |
| 9,038,252 B2 * | 5/2015 | Ali | B68G 7/00 |
| | | | 29/91.1 |
| 9,738,192 B2 * | 8/2017 | Hirata | B60N 2/01508 |
| 10,124,699 B2 | 11/2018 | Galbreath et al. | |
| 10,328,829 B2 | 6/2019 | Galbreath et al. | |
| 2004/0262963 A1 * | 12/2004 | Ali | B60N 2/002 |
| | | | 297/217.3 |
| 2007/0236072 A1 * | 10/2007 | Galbreath | B60N 2/70 |
| | | | 297/452.27 |
| 2010/0181796 A1 * | 7/2010 | Galbreath | B60N 2/72 |
| | | | 296/63 |
| 2015/0232007 A1 | 8/2015 | Ali et al. | |

FOREIGN PATENT DOCUMENTS

| | | |
|---|---|---|
| GB | 2 441 418 A | 5/2008 |
| WO | 2012/173766 A1 | 12/2012 |

* cited by examiner

VEHICLE SEAT ASSEMBLY HAVING A SURFACE TEXTURING INTRUSIONS

CROSS-REFERENCE TO RELATED APPLICATIONS

This application claims the benefit of U.S. provisional application Ser. No. 62/705,542 filed Jul. 2, 2020, the disclosure of which is hereby incorporated in its entirety by reference herein.

TECHNICAL FIELD

The disclosure relates to a vehicle seat assembly having surface texturing intrusions and method of making the same. More specifically, the present disclosure relates to a vehicle seat assembly having areas configured to have lower hardness than other areas of the seat assembly and methods of making the same.

BACKGROUND

Generally speaking, a typical vehicle seat assembly includes three fundamental components: (a) a frame to support the seat assembly and to mount it to a vehicle; (b) a foam cushion to cover the frame; and (c) trim material to cover the foam cushion and provide a durable surface for contact with a vehicle occupant. Typically, the foam cushion is made from an expandable foam material, such as polyurethane, and is molded to a predetermined shape during a molded process. For example, the predetermined shape of a typical bucket-style seat includes raised front, side, and rear bolster areas and recessed central seating and back sections. The trim material may include any number of materials, such as cloth, polymers, or leather.

SUMMARY

In at least one embodiment according to the disclosure, a vehicle seat assembly includes a cushion having an "A" surface and a "B" surface, a central portion, and two side bolster areas. Each side bolster area is adjacent the central portion, and the central portion of the cushion has a plurality of spaced apart molded intrusions extending from the "A" surface towards the "B" surface to form a hardness gradient of 5% to 25% between at least one of the side bolster areas and the central portion. The plurality of spaced intrusions comprises a plurality of pairs of patterns, with each pair of patterns comprising a first pattern spaced apart and opposingly and inversely facing a second pattern.

In at least another embodiment according to the disclosure, a vehicle seat assembly includes a foam cushion having an "A" surface and a "B" surface, a central portion, a first side bolster area adjacent the central portion, a second side bolster area opposite the first side bolster area and adjacent the central portion, and a front bolster area extending between and connecting the first and second side bolster areas. The central portion of the cushion has a plurality of intrusions extending from the "A" surface towards the "B" surface. The central portion has a first hardness and the first side bolster area having a second hardness at least 5% greater than the first hardness. The plurality of intrusions comprises a plurality of spaced pairs of patterns, with each pair of patterns comprising a first shaped pattern spaced apart and facing a second shaped pattern. Each pattern has a first portion extending generally parallel to each other and the first and second side bolsters in a first direction and a second portion extending in a second direction towards the other pattern.

A method of making a vehicle seat assembly is also provided and includes providing a cushion having an "A" surface, a "B" surface, a central portion, and two side bolster areas. The central portion of the cushion has a plurality of spaced apart intrusions extending from the "A" surface towards the "B" surface to form a hardness gradient of 5% to 25% between at least one of the side bolster areas and the central portion. The plurality of spaced intrusions comprises a plurality of pairs of patterns, with each pair of patterns comprising a first pattern spaced apart and opposingly and inversely facing a second pattern. The method also includes securing the cushion to a frame, and covering the cushion with a trim member.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure.

Moreover, except where otherwise expressly indicated, all numerical quantities in this description and in the claims are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1:
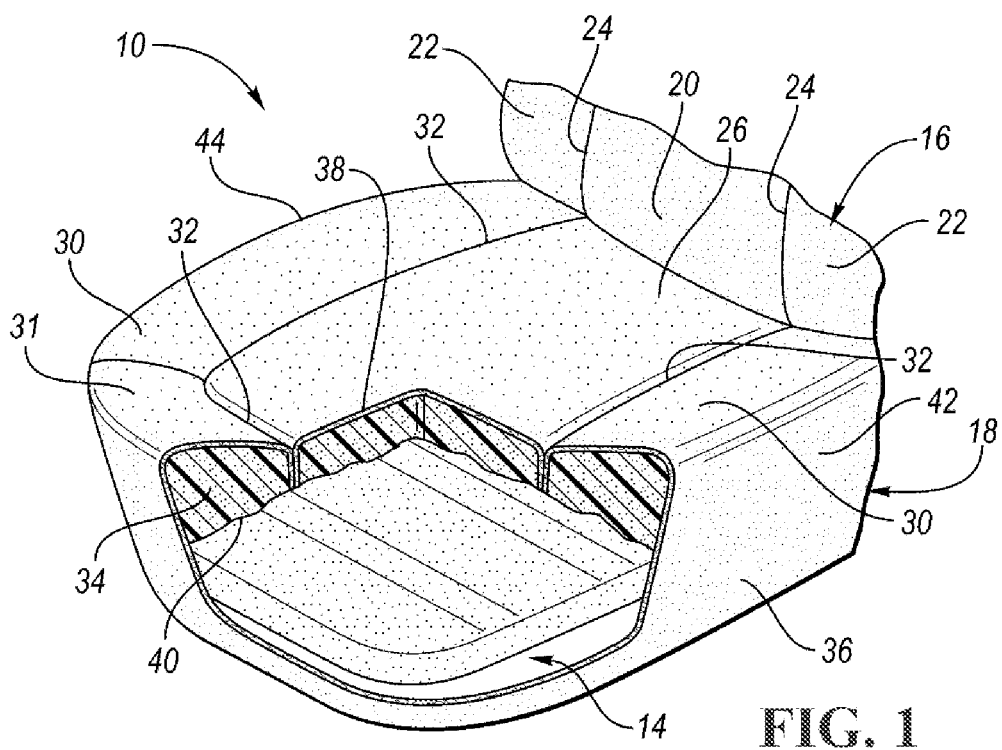
FIG. 1 is a cut-away environmental view of a vehicle seat assembly in accordance with an embodiment of the present disclosure.

Referring now to the figures, where like numerals are used to designate like structure throughout to the drawings, a schematic vehicle seat assembly in accordance with at least one embodiment of the present disclosure is generally shown at 10 in FIG. 1. While the vehicle seat assembly 10 is illustrated in FIG. 1 to be a bucket seat assembly, it should be understood that the principles of the present disclosure are applicable to other types of seat assemblies, such as bench, captain, and other types of seat assemblies. It should also be understood that the principles of the present disclosure are applicable to other applications where foam is a component such as back rests, back support pads, arm rests, and head restraints.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy or a suitable polymer. Further, the seat frame 14 may be manufactured using a technique commonly known in the art, relative to the type of material employed. By way of example, manufacturing techniques may include stamping, welding, fastening or molding a suitable material to form a seat frame 14.

The vehicle seat assembly 10 comprises a seat back, generally indicated at 16, and a lower seat assembly, generally indicated at 18. In at least the illustrated embodiment, the seat back 16 includes a central back support pad 20, side bolsters 22, and trenches 24 between the bolsters 22 and the pad 20. In at least the illustrated embodiment, the lower seat assembly 18 includes a central seating pad 26, a plurality of bolsters 30 and 31 substantially surrounding at least two opposing sides, and as shown here, three sides, of the central seating pad 26, and trenches 32 between the bolsters 30 and 31 and the pad 26. Bolsters 30 are located at opposite sides (i.e., inboard and outboard) of the lower seat assembly 18 and the bolster 31 is located at the front of the lower seat assembly 18 and extends between and connects the front portions of the bolsters 30.

The lower seat assembly 18 further includes a back foam cushion (not shown) and a seat foam cushion generally indicated at 34. The seat foam cushion 34 is conventionally secured to the seat frame 14 and/or a seat assembly infrastructure (not shown). The foam cushion 34 may be secured to the seat frame 14 and/or infrastructure by any method generally known in the art, such as by an adhesive. It should be understood while the foam cushion 34 is illustrated to be a bucket-seat bottom cushion, the present disclosure can be applicable to any type of seat cushion such as a seat back cushion for a bucket-seat and seat back and bottom cushion for bench seats, as well as other types of seats.

The lower seat assembly 18 also includes a trim material 36 adapted to engage the foam cushion 34 (or cushions) in a covering relationship. The trim material 36 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 36 for increasing strength without increasing rigidity.

The seat cushion 34 has an upper surface 38 and a lower surface 40 that is spaced from the upper surface 38. The upper surface 38 of the seat cushion 34 may be referred to as the "A" surface, and the lower surface 40 may be referred to as the "B" surface. The seat cushion 34 also defines an inboard side 42 and an outboard side 44. When an occupant (not shown) is supported on the lower seat assembly 18, the weight of the occupant will generally apply an axial load directed generally through the upper surface 38 of the seat cushion 34 towards the lower surface 40. Although the weight of the occupant will generally induce an axial as well as sheer force in the seat cushion 34, those having ordinary skill in the art will recognize that the primary load path of the occupant's weight will be substantially vertical from the upper surface 38 towards the lower surface 40 through the seat cushion. However, when the occupant is getting in and out of the vehicle, an increased and substantially sizeable load will typically be placed on the inboard and outboard bolster portions 30 of the seat cushion 34.

In accordance with the present disclosure, a seat cushion 34 is provided that has one or both side bolsters 30 having a greater hardness relative to the central seating pad 26. In at least one embodiment, the bolster 31 also has a greater hardness relative to the central seating pad 26. To provide the desired hardness gradient, seat cushion 34 includes a plurality of L-shaped intrusions 50 extending from the "A" surface 38 towards the "B" surface 40 to provide a seat cushion 34 having varying hardness areas. For instance, the seat cushion 34 is configured so that one or more of the bolsters 30 is harder than the central seating pad 26. Moreover, the seat cushion 34 could be configured so that all of the bolsters 30 and 31 are harder than the central seating pad 26.

In at least one embodiment, the present disclosure enables the modification of the hardness of the foam primarily in the central seating pad 26, i.e., areas of typical consumer contact while driving, while keeping the other areas of the seat cushion 34, i.e., the bolsters 30 and 31, firmer to enable improved craftmanship and durability performance and provide lateral support to occupants while traveling on curved roadways and during turning. Such a configuration enables the central seating pad 26 to be softer for improved occupant comfort while allowing the bolster(s) 30 and/or 31 to be harder to account for the typically higher loads placed upon the bolster(s) 30 and/or 31 upon occupant ingress and egress. Such a configuration can also assist the seat assembly 10 in achieving H-point specification without significantly modifying seat assembly packaging. In other words, the implementation of intrusions and/or protrusions in accordance with the present disclosure can modify the seat cushion 34 in such a way that allows the seat assembly 10 to achieve a desired H-point without having to change the overall shape or size of the cushion 34. Additionally, the implementation of can also assist the seat assembly 10 in achieving a weight reduction and/or cost reduction.

Figure 2:
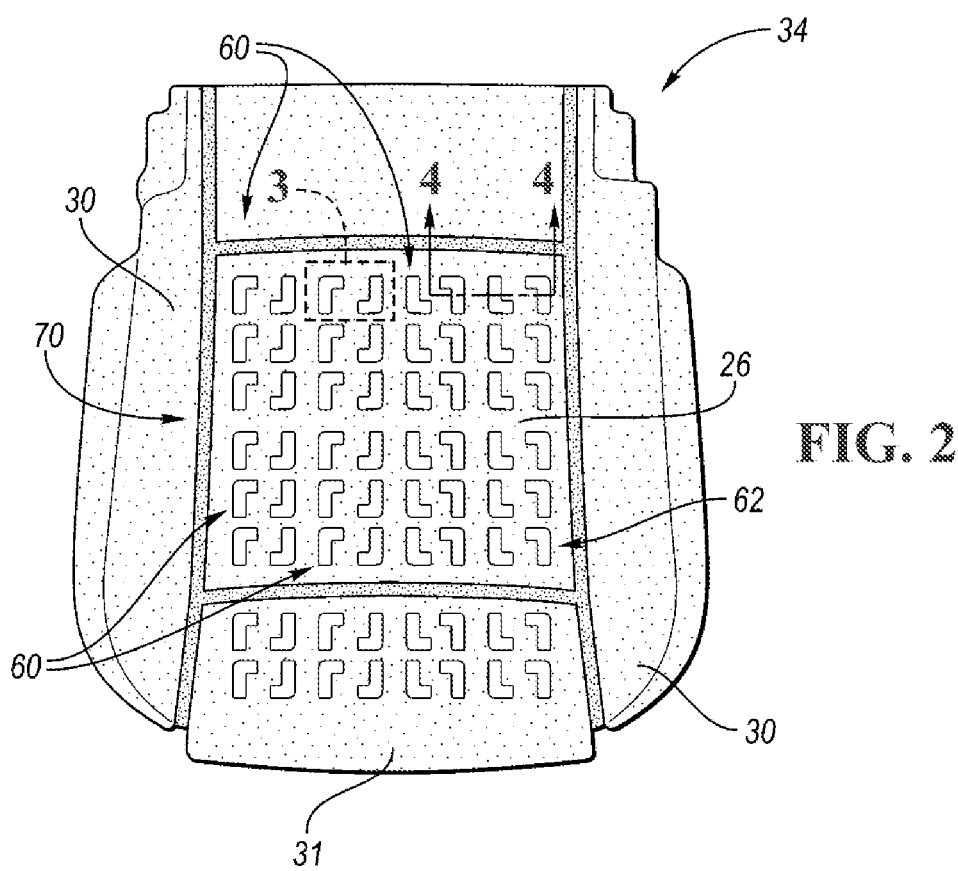
FIG. 2 is a top perspective view of a bottom seat cushion useable with the vehicle seat assembly illustrated in FIG. 1.

As best shown in FIG. 2, the central seating pad 26 of the seat cushion 34 includes a plurality of L-shaped intrusions 50. The L-shaped intrusions 50 are arranged in a pattern 70 over the "A" surface 38 of the central seating pad 26 of the seat cushion 34. As best shown in FIG. 2, in at least one embodiment, the plurality of L-shaped intrusions 50 are arranged in a pattern of spaced apart rows 60. Each row 60 comprises a plurality of pair 62 of L-shaped intrusions 50. In at least the illustrated embodiment, each pair 62 of L-shaped intrusions 50 comprises a first L-shaped intrusion 50a and a second L-shaped intrusion 50b, wherein the intrusions 50a and 50b are opposingly and inversely facing each other. It has been found that such an arrangement provides favorable spring action and dampening impact.

In at least one embodiment, each of the rows 60 of the L-shaped intrusions 50 are spaced apart 5 to 30 mm, in at least another embodiment 5 to 25 mm, in yet another embodiment 10 to 20 mm, and in still yet another embodiment 10 to 15 mm. It should be understood that while the rows 60 of L-shaped intrusions 50 are shown to be straight rows, that any suitable arrangement could be employed.

In at least one embodiment, each of the L-shaped intrusions 50a and 50b of the pairs 62 of L-shaped intrusions 50 are spaced apart 5 to 30 mm, in at least another embodiment 5 to 25 mm, in yet another embodiment 10 to 20 mm, and in still yet another embodiment 10 to 15 mm. In at least one embodiment, due to being arranged opposingly and inversely facing, each pair 62 of L-shaped intrusions 50 is arranged in a generally open rectangular or open rectangular shape. In yet another embodiment, each pair 62 of L-shaped intrusions 50 is arranged in a generally open square or open square shape. Such an arrangement has been found to provide a relatively even load distribution while avoiding any substantial impression left on the trim cover 36.

The pattern 70 is arranged to provide the desired level of comfort and structural stability. In at least one embodiment the pattern 70 of the plurality L-shaped intrusions 50 comprise 10% to 50% of the surface area of the central portion 26 of the seat pad 34, in another embodiment 15% to 45%, and in yet another embodiment 25% to 40%. Such an arrangement has been found to provide a relatively even load distribution while avoiding any substantial impression left on the trim cover 36.

In at least one embodiment, each of the L-shaped intrusions 50 have a length l of 5 to 30 mm, in yet another embodiment of 10 to 20 mm, and in yet another embodiment of 15 to 20 mm. In at least one embodiment, each of the L-shaped intrusions 50 have a base length b of 10 to 25 mm, in yet another embodiment of 10 to 20 mm, and in yet another embodiment of 15 to 20 mm. Each of the L-shaped intrusions 50 have a width w of 5 to 20 mm, in yet another embodiment of 5 to 15 mm, and in yet another embodiment of 10 to 20 mm.

In at least one embodiment, each of the L-shaped intrusions 50 have a length l that is 1 to 1.75 times the base length b, in yet another embodiment of 1.1 to 1.6 times, and in yet another embodiment of 1.25 to 1.5 times. In at least one embodiment, each of the L-shaped intrusions 50 have a projection length b1 that is 50% to 125% the longitudinal length l1, in yet another embodiment 60% to 100%, and in yet another embodiment 70% to 80%.

Figure 3:
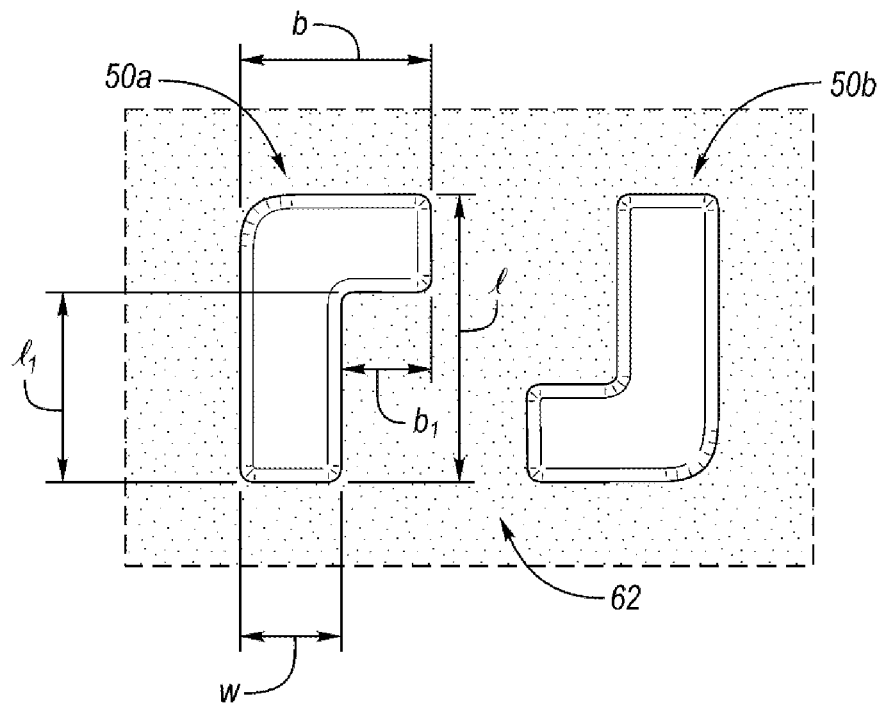
FIG. 3 is an enlarged view of a portion of the seat assembly illustrated in FIG. 2.

In at least one embodiment, the L-shaped intrusions 50 each have a first portion l extending in a first direction and the second portion b1 extending in a second direction generally transverse to the first direction. As best shown in FIG. 3, a pair 62 of L-shaped intrusions 50 have a pair of parallel first portions L and a pair of parallel second portions b1. In at least one embodiment, the first portions L have a length of 10 to 40 mm, in another embodiment 15 to 35 mm, what and in yet another embodiment 18 to 30 mm. In at least one embodiment, the second portions b1 have a length of 5 to 20 mm, in another embodiment 7.5 to 17.5 mm, and in yet another embodiment 10 to 15 mm. In an embodiment, the first portions 1 in each respective pair 62 of L-shaped intrusions 50 are spaced from each other 5 to 20 mm, in another embodiment 7.5 to 17.5 mm, and in yet another embodiment 10 to 15 mm. In an embodiment, the second portions b1 in each respective pair 62 of L-shaped intrusions 50 are spaced from each other 5 to 20 mm, in another embodiment 7.5 to 17.5 mm, and in yet another embodiment 10 to 15 mm.

While the harness gradient can generally be achieved by providing L-shaped intrusions 50 that extend from the "A" surface 38 towards the "B" surface 40, it is contemplated that the location and/or size of the intrusions can vary as desired. However, in at least one embodiment, the seat cushion 34 of the present disclosure has a hardness gradient between at least one of the bolsters 30 and 31 and the central seating pad 26 area of the seat cushion 34 of between 5% to 25%. In other words, at least one of the bolster areas 30 and 31 has a hardness that is at least 5% to 25% greater than the hardness of the central seating pad 26. In at least certain embodiments, the seat cushion 34 has a hardness gradient between the bolsters 30 and the central seating pad 26 of between 5% to 25%. The hardness can be measured by indentation force deflection (IFD) as measured by ASTM test method No. D3574. In another embodiment, the seat cushion 34 of the present disclosure has a hardness gradient between at least one of the bolsters 30 and 31 and the central seating pad 26 of the seat cushion 34 of between 10% and 20%, and in other embodiments of between 12% and 18%.

At least one of the bolsters 30, 31, preferably both of the side bolsters 30, and in certain environments all of the bolsters 30 and 31, have a hardness gradient greater than the hardness of the central seating pad 26. In at least one embodiment, the hardness of the central seating pad 26 of the seat cushion 34, as measured by ASTM test method No. D3574, is between 100 and 300 newtons, and in other embodiments between 150 and 250 newtons. In at least another embodiment, the hardness of at least one of the bolsters 30 and 31, as measured by ASTM test method D3574, is between 230 and 350 newtons, and in other embodiments between 250 to 300 newtons. In at least certain embodiments, the hardness of each of the bolsters 30 and 31, as measured by ASTM test method D3574, is between 230 and 350 newtons and in other embodiments between 250 and 300 newtons. In certain embodiments, the hardness range can be 4.5 to 12 kPa and the density range can be 45 to 75 KG/m$^3$.

Furthermore, in at least one embodiment, the seat cushion 34 of the present disclosure has a hysterisis loss gradient between at least one of the bolsters 30 and 31 and the central seating pad 26 area of the seat cushion 34 are between 5% to 25%. In other words, at least one bolster area has a hysterisis loss that is at least 5% to 25% less than the hysterisis loss of the central seating pad 26. The hysterisis loss can be measured by indentation force deflection (IFD) as measured by ASTM test method No. D3574. In another embodiment, the seat cushion 34 of the present disclosure has a hysterisis loss gradient between at least one of the bolsters 30 and the central seating pad 26 of the seat cushion 34 of between 10% and 20%, and in other embodiments of between 12% and 18%. In yet another embodiment, the seat cushion 34 has a hysterisis loss gradient between each of the bolsters 30 and 31 and the central seating pad 26 of the seat cushion 34 of between 10% and 20%, and in other embodiments of between 12% and 18%.

In at least one embodiment, the front bolster 31 has a lower hardness gradient relative to the central seating pad 26 than one or both of the side bolsters 30 to provide a front bolster 31 that is softer (primarily for comfort) than at least one of the side bolsters 30. In this embodiment, the front bolster has a hardness of 150 to 300 newtons, and in other embodiments of 200 to 250 newtons. In this embodiment, the hardness gradient between the front bolster 31 and at least one of the central seating pad 26 is 5% to 20%, and the hardness gradient between the front bolster 31 and the side bolsters 30 is 8% to 25%. In at least one other embodiment, the hardness gradient between the front bolster 31 and the central seating pad 26 is 8% to 18%, and the hardness gradient between at least one of the front bolster 31 and the side bolsters 30 is 10% to 22%.

Figure 4:
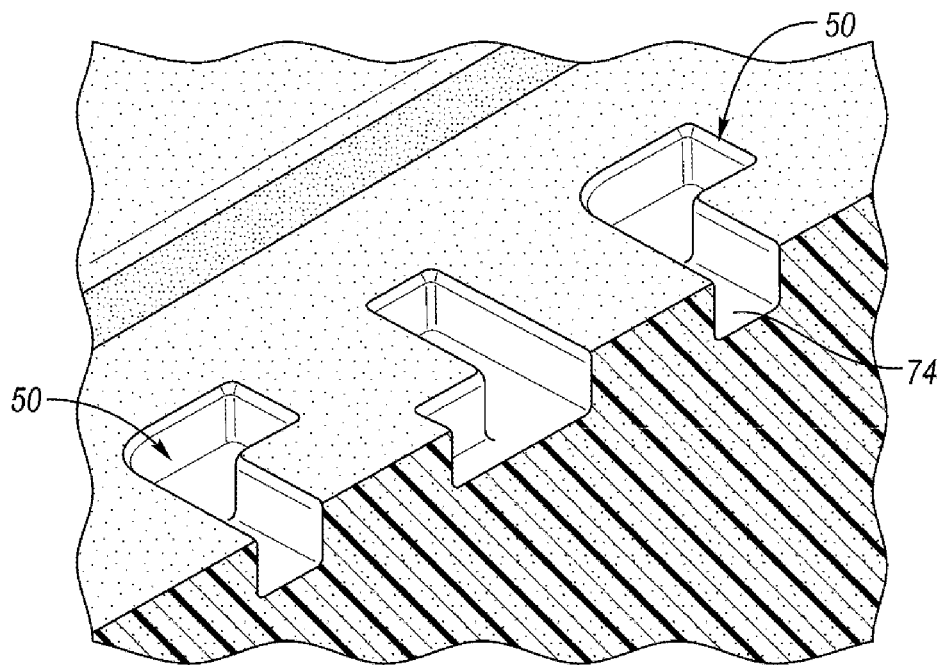
FIG. 4 is a cross-sectional view taken along line 4-4 of a portion of the seat cushion illustrated in FIG. 2.

Referring to FIGS. 3 and 4, schematic perspective and cross-sectional views of an embodiment of a seat cushion 34 is shown. The central seating pad 26 has a number of L-shaped intrusions 50 that extend from the "A" surface 38 towards the "B" surface 40. In at least one embodiment, the L-shaped intrusions 50 include a generally axial, L-shaped wall 72 that extends between and connects the "A" surface 38 with a generally transverse L-shaped intrusions bottom surface 74. In at least one embodiment, hole bottom surface 48 is spaced 1 to 30 mm from the "A" surface 38, in at least another embodiment 2 to 20 mm, and in yet another embodiment 7 to 15 mm.

While the L-shaped intrusions 50 are shown to be a certain shape, it should be understood that the L-shaped intrusions 50 can vary in size and shape as desired, as long as they maintain a general L-shape. While the location, size and/or shape of the L-shaped intrusions 50 can vary as desired, in at least one embodiment, the location, size and/or shape of the L-shaped intrusions can be selected based upon a counter response to pressure input of an average measurement of demographic matching consumers in static and dynamic measured clinics in the vehicle. In at least one embodiment, the cushion 34 can be tuned with L-shaped intrusions 50 to provide areas of lower hardness in areas of expected higher occupant pressure. Thus, in at least one embodiment, the areas of expected higher occupant pressure will have less L-shaped intrusions 50 and/or smaller L-shaped intrusions than areas of expected lower occupant pressure.

In at least one embodiment, the L-shaped intrusions 50 have and a depth or length of 1 to 30 mm, in other embodiments of 5 to 20 mm, and in yet other embodiments of 8 to 15 mm. Moreover, in at least one embodiment, it has been found useful to provide the L-shaped intrusions 50 with a radius of 1 to 10 mm, and in other embodiments of 2 to 7 mm, to assist in the molding of the seat cushion.

It should be understood that the size, shape, and/or geometry of the L-shaped intrusions 50 can vary from each other. For instance, one L-shaped intrusions 50 can be different in size, shape, and/or geometry from another L-shaped intrusions 50.

Moreover, while the L-shaped intrusions 50 can be provided to provide a density and/or hardness gradient to tailor the specific comfort requirements of the seat assembly, the L-shaped intrusions 50 could also be used to reduce weight of the overall seat assembly, and in particular the foam cushion 34. Furthermore, as discussed above, the L-shaped intrusions 50 can be provided to assist the seat assembly 10 in achieving a desired H-point and/or cost reduction. Moreover, while the seat assembly 10 has been described as having bolster portion(s) that are harder than the remainder of the seat assembly, it should be understood that the principles of the present disclosure can be used to manufacture seat assemblies having areas of the seat assemblies that are harder, or at least as hard, as one or more of the bolsters. The L-shaped intrusions 50 arrangement has been found to provide a relatively even load distribution while avoiding any substantial impression left on the trim cover 36. The seat cushion 34 of the present disclosure can be made by a variety of methods. In at least one embodiment, the seat cushion 34 is made by molding wherein the L-shaped intrusions are molded into the seat cushion 34 during the molding operation. In this embodiment, the foam molding tool can be provided with L-shaped protrusions and/or cavities around and/or within which the foam can be molded. It should be understood that other manufacturing means could be used, such as die-cutting the L-shaped intrusions 50. In at least one embodiment, it has been found useful to provide molding tools having molding surfaces that result in L-shaped intrusions 50 having a radius of 4 to 15 mm, and in other embodiments of 6 to 12 mm, to assist in the molding of the seat cushion.

While embodiments of the disclosure have been illustrated and described, it is not intended that these embodiments illustrate and describe all possible forms of the disclosure. Moreover, the words used in the specification are words of description rather than limitation, and it is understood that various changes may be made without departing from spirit and scope of the disclosure.

What is claimed is:

1. A vehicle seat assembly comprising:
a cushion having an "A" surface and a "B" surface, a central portion, and two side bolster areas, with each side bolster area being adjacent the central portion, the central portion of the cushion having a plurality of spaced apart molded intrusions extending from the "A" surface towards the "B" surface to form a hardness gradient of 5% to 25% between at least one of the side bolster areas and the central portion, the plurality of spaced intrusions comprising a plurality of pairs of patterns, each pair of patterns comprising a first pattern spaced apart and opposingly and inversely facing a second pattern, each pattern having a first portion extending generally parallel to each other in a first direction and a second portion extending in a second direction towards the other pattern.

2. The vehicle seat assembly of claim 1 wherein the plurality of pairs of patterns are arranged in evenly spaced apart rows.

3. The vehicle seat assembly of claim 2 wherein each pair of the plurality of pairs is spaced apart 5 to 30 mm.

4. The vehicle seat assembly of claim 1 wherein the plurality spaced intrusions comprise 10% to 50% of the surface area of the central portion.

5. The vehicle seat assembly of claim 1 wherein the intrusions have a depth of 5 to 20 mm from the "A" surface of the cushion.

6. The vehicle seat assembly of claim 5 wherein each pair of the plurality of pairs of patterns comprises a pair of L-shaped intrusions.

7. The vehicle seat assembly of claim 6 wherein the L-shaped intrusions have a length of 5 to 30 mm.

8. The vehicle seat assembly of claim 5 wherein each of the L-shaped intrusions of the pairs of patterns is opposingly and invertedly facing relative to the other L-shaped intrusion of the pair.

9. The vehicle seat assembly of claim 8 wherein each pair of L-shaped intrusions has a generally rectangular shape.

10. The vehicle seat assembly of claim 9 wherein each pair of L-shaped intrusions has a generally square shape.

11. The vehicle seat assembly of claim 1 wherein the at least one bolster areas has a hardness that is at least 5% to 25% greater than the hardness of the central portion.

12. The vehicle seat assembly of claim 1 wherein the cushion comprises a molded foam cushion and the plurality of spaced intrusions are formed during the molding of the cushion.

13. The vehicle seat assembly of claim 1 wherein the cushion comprises a seat bottom cushion, and having a front bolster having a lower hardness than at least one of the side bolster areas.

14. A vehicle seat assembly comprising:
a foam cushion having an "A" surface and a "B" surface, a central portion, a first side bolster area adjacent the central portion, a second side bolster area opposite the first side bolster area and adjacent the central portion, and a front bolster area extending between and connecting the first and second side bolster areas, wherein the central portion of the cushion has a plurality of intrusions extending from the "A" surface towards the "B" surface, the central portion having a first hardness and the first side bolster area having a second hardness at least 5% greater than the first hardness, the plurality of intrusions comprising a plurality of spaced pairs of patterns, each pair of patterns comprising a first shaped pattern spaced apart and facing a second shaped pattern, each pattern having a first portion extending generally parallel to each other and the first and second side bolsters in a first direction and a second portion extending in a second direction towards the other pattern.

15. The vehicle seat assembly of claim 14 wherein the first and second patterns are L-shaped.

16. The vehicle seat assembly of claim 15 wherein the plurality of spaced pairs of patterns are arranged in evenly spaced apart rows and with the second portions being generally parallel so that each pair of L-shaped intrusions has a generally rectangular shape.

17. The vehicle seat assembly of claim 16 wherein each pair of L-shaped intrusions has a generally square shape, each pair of L-shaped intrusions is spaced apart 5 to 30 mm from an adjacent pair of L-shaped intrusions, the intrusions having a depth of 5 to 20 mm from the "A" surface of the cushion.

18. A method of making a vehicle seat assembly, the method comprising:

providing a cushion having an "A" surface, a "B" surface, a central portion, and two side bolster areas, the central portion of the cushion having a plurality of spaced apart intrusions extending from the "A" surface towards the "B" surface to form a hardness gradient of 5% to 25% between at least one of the side bolster areas and the central portion, the plurality of spaced intrusions comprising a plurality of pairs of patterns, each pair of patterns comprising a first pattern spaced apart and opposingly and inversely facing a second pattern, each pattern having a first portion extending generally parallel to each other in a first direction and a second portion extending in a second direction towards the other pattern;

securing the cushion to a frame; and covering the cushion with a trim member.

19. The method of claim 18 wherein the plurality of pairs of patterns are arranged in rows evenly spaced apart 10 to 20 mm.

20. The method of claim 19 wherein the providing step comprises molding a polymeric material to form a foam cushion and the intrusions comprise molded intrusions having a depth of 0.5 to 0.20 mm from the "A" surface of the cushion.

* * * * *